United States Patent
Lydon et al.

[15] 3,705,306
[45] Dec. 5, 1972

[54] AIRCRAFT NAVIGATION SYSTEM WITH VERTICAL GUIDANCE

[72] Inventors: Lloyd E. Lydon, Northridge; Charles J. Steigleder, Encino; Warren E. Carpenter, Malibu, all of Calif.

[73] Assignee: Hughes Aircraft Company, Culver City, Calif.

[22] Filed: Sept. 30, 1970

[21] Appl. No.: 76,877

[52] U.S. Cl.........235/150.2, 235/150.26, 244/77 D, 343/112 A
[51] Int. Cl..............................................G06f 15/50
[58] Field of Search........244/77 A, 77 D; 343/112 A; 235/150.2, 150.26; 318/584

[56] References Cited

UNITED STATES PATENTS 3,398,267   8/1968   Hattendorf......................235/150.26

Primary Examiner—Eugene G. Botz
Assistant Examiner—R. Stephen Dildine, Jr.
Attorney—James J. Haskell and Walter J. Adam

[57] ABSTRACT

An aircraft navigation system with vertical guidance in which a vertical profile is computed based on the difference in altitudes between start and destination points and the distance therebetween. The vertical profile and aircraft altitude are used to derive a displayed error signal which indicates the required aircraft altitude correction needed to reach and maintain the aircraft on the profile so that when it reaches the destination point it is at the selected altitude above it. Also displayed is a vertical speed which should be maintained to maintain the aircraft on the profile or on a line parallel thereto.

17 Claims, 10 Drawing Figures

INVENTORS.
LLOYD E. LYDON,
CHARLES J. STEIGLEDER,
WARREN E. CARPENTER,
BY
Walter J. Adam
ATTORNEY.

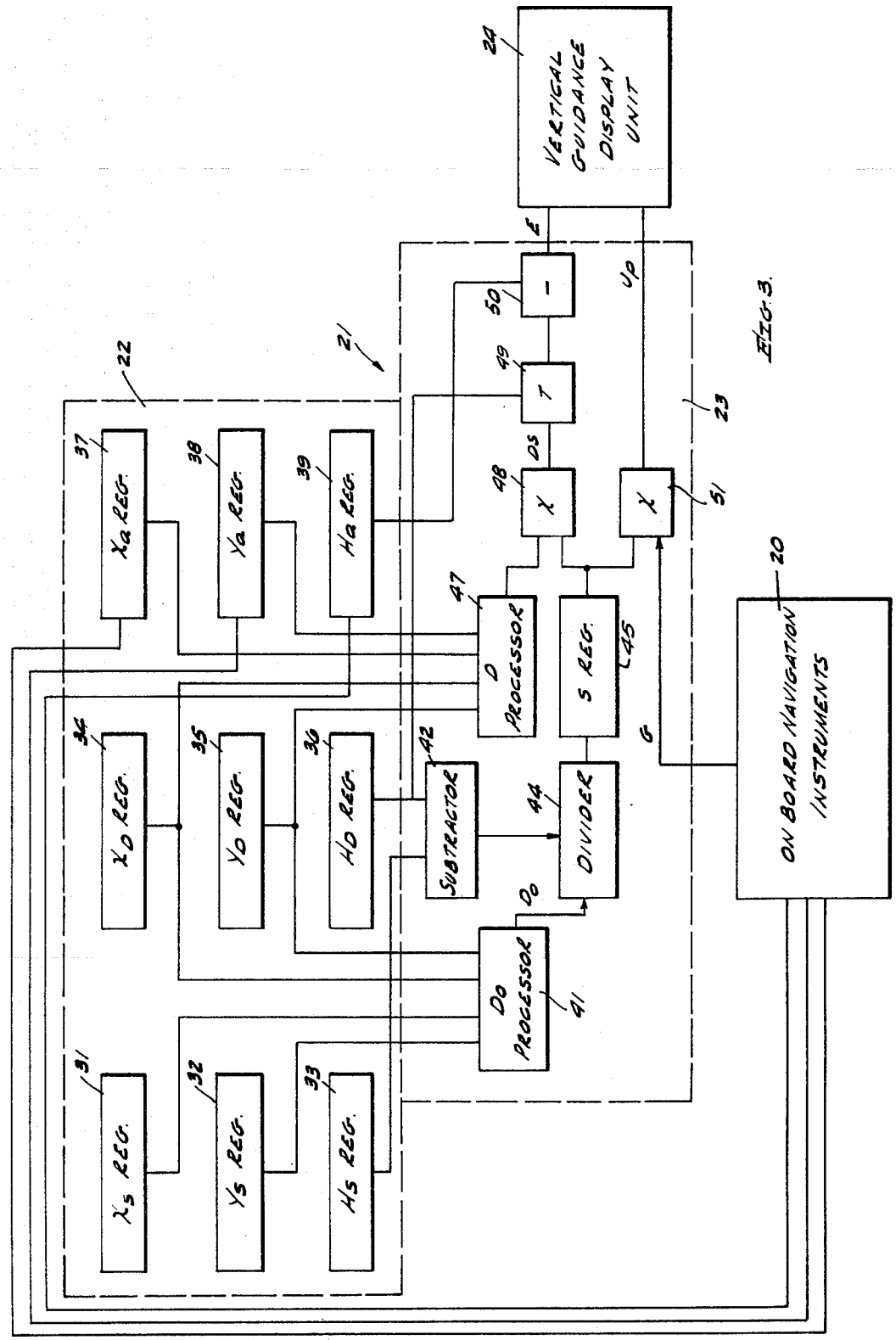

AIRCRAFT NAVIGATION SYSTEM WITH VERTICAL GUIDANCE

BACKGROUND OF THE INVENTION

1. Field of the Invention

The present invention relates to aircraft navigation instrumentation and more particularly to an improved navigation director system with vertical guidance capability.

2. Description of the Prior Art

Herebefore, a navigation director has been developed in which steering symbology is integrated with current position presentation on a movable chart. The navigation director provides the capability of accurately navigating an aircraft between any two selected geographic points, designated by latitude and longitude. The heart of the navigation director is a digital computer which processes air data, magnetic heading and VORTAC data to continually calculate aircraft position in latitude and longitude. Position date is presented to the pilot by moving an optically displayed map on the face of the instrument until the aircraft position on the map is at the center of the display, at which the aircraft is represented by a permanently fixed symbol.

The display instrument also includes a compass rose, an aircraft heading marker and a command heading marker. The computer of the navigation director computes a great circle route between two selected points, commonly referred to as waypoints. A segment of this great circle route is presented to the pilot by a route segment indicator (RSI) over the displayed navigation map. The RSI passes through the center of the display only when the aircraft is on the desired course between the two waypoints. If the aircraft is off course, the RSI is displaced from the center of the display a distance proportional to the cross-track distance of the aircraft position from the computed great circle route.

The navigation director is further provided with means which enable the pilot to designate any point, such as the aircraft's present position as a start point during actual flight. This point is then used by the computer to compute a course from the new start point to the designated destination point. Furthermore, means are provided to enable the pilot to confirm that the computed and displayed course are to a designated destination point. This is done by manually switching the system to a CONFIRM mode in which the map, under computer control, is slewed so that the destination point on the map appears under the aircraft symbol. In another embodiment of the navigation director the lateral deviation of the aircraft from the computed course, rather than a segment of the course, is displayed by means of lateral deviation bars, spaced from an aircraft symbol a distance corresponding to the lateral deviation.

Such a system has been found to be most useful for aircraft horizontal guidance. The prior art system, however, does not include any means for vertical guidance. Recent studies of present and future air traffic clearly indicate the need for three dimensional air traffic guidance.

OBJECTS AND SUMMARY OF THE INVENTION

It is a primary object of the present invention to provide a new improved navigation director system.

Another object of the pr-sent invention is to provide a three dimensional aircraft navigation system.

A further object of the present invention is to provide vertical guidance capability in a navigation director system which herebefore provided only horizontal aircraft guidance.

These and other objects of the invention are achieved in one embodiment of the invention in which means are provided in a navigation director with which the pilot may select a desired altitude at which he wants to pass over a destination point. When this altitude is selected, the navigation director computer computes an altitude profile which the aircraft should maintain as it flies towards the destination point so that when it is over the point, the aircraft is at the selected altitude. During the flight the computer computes the required altitude profile and based thereon and the aircraft's actual altitude it provides an altitude error signal which is the difference between the required and the actual altitudes. The polarity and magnitude of the error signal are displayed to enable the pilot to achieve and maintain the desired altitude.

In addition, the computer computes a profile vertical speed which the aircraft should maintain to stay on the profile or on a line parallel to it. The profile vertical speed, which is displayed together with the displayed error signal, provide the pilot optimum information to reach and stay on the selected vertical profile so that when the aircraft reaches the destination point it is at the selected altitude.

In another embodiment of the present invention, the selected altitude above the destination point, actual aircraft altitude actual ground speed and the aircraft's distance to the destination point are used by the computer to compute a command vertical speed. This command represents the vertical speed required to reach the destination point altitude from the present altitude at the present ground speed. The displayed vertical speed command enables the pilot to plan an optimum descent.

The novel features of the invention are set forth with particularity in the appended claims. The invention will best be understood from the following description when read in conjunction with the accompanying drawings.

BRIEF DESCRIPTION OF THE DRAWINGS

FIG. 3 is a block diagram of computer circuitry needed to implement the teachings of the present invention;

DESCRIPTION OF THE PREFERRED EMBODIMENTS

Figure 1:
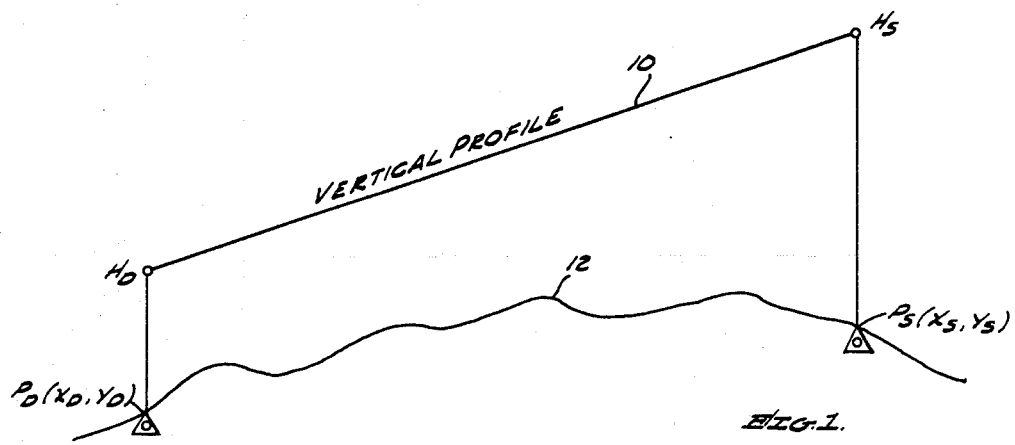
FIGS. 1 and 2 are simple profile diagrams useful in explaining the present invention.

Attention is first directed to FIG. 1 wherein $P_S$ and $P_D$ represent start and destination waypoints respectively, with longitude and latitude coordinates respectively designated $X_S$, $Y_S$ and $X_D$, $Y_D$. In the prior art navigation director system, these coordinates are entered into the computer and a great circle route is computed. A segment of this route, or the lateral deviation of the aircraft therefrom, is displayed to aid the pilot in navigating the aircraft to point $P_D$. However, the aid is only for horizontal navigation. It does not provide vertical navigation guidance of the type which would enable a pilot to guide the aircraft's altitude along a selected vertical profile as it flies from start point $P_S$ to destination point $P_D$. For example, it does not provide aircraft guidance along a vertical profile 10 above the terrain 12, where the profile is defined by a start altitude $H_S$ above $P_S$, and an altitude $H_D$ above the destination point $P_D$. The importance of vertical guidance increases due to the significant rise in the number of aircraft and aircraft traffic.

As is appreciated, the definition of a vertical profile, such as profile 10 requires specification of the latitude, longitude and altitude for each of the two points. Latitude and longitude of each point are already stored and used in the prior art navigation director system. Also therein the horizontal distance between $P_S$ and $P_D$ is computed and the distance of the aircraft to the destination point is continually computed as well as aircraft ground speed. In accordance with the teachings of the present invention, the computer is further provided with altitude information and with additional computing or processing circuits to provide the pilot with a vertical guidance capability, e.g., the capability to guide an aircraft to fly along vertical profile 10.

Figure 2:
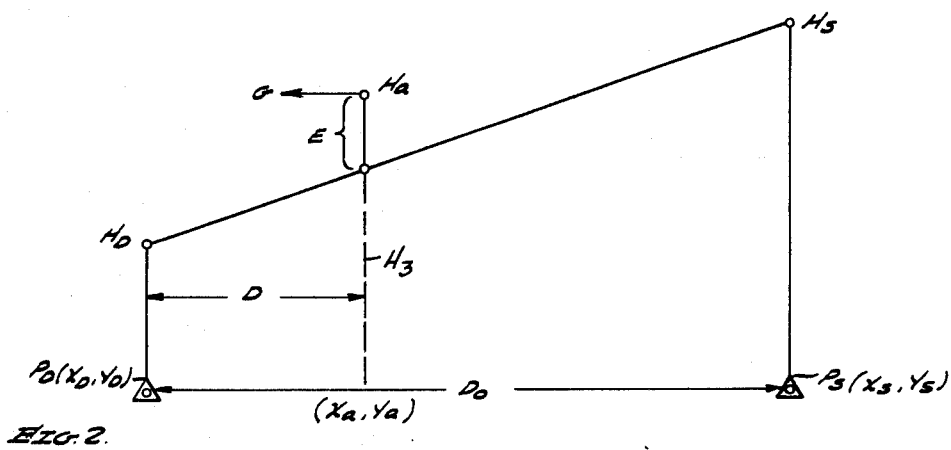

Briefly, in accordance with the present invention, the altitudes $H_S$ and $H_D$ may be stored in the computer, together with the horizontal coordinates of $P_S$ and $P_D$. Then as the course between $P_S$ and $P_D$, or the lateral deviation therefrom, is displayed while the aircraft is over $P_S$, the computer utilizes these altitudes together with the distance between these points, designated $D_0$ in FIG. 2, and computes the slope of the desired vertical profile. Defining the slope as $S$, $$S = H_S - H_D/D_0.$$

As the aircraft proceeds toward $P_D$, the computer computes the altitude of the aircraft, needed to maintain it on the profile. Assuming that the aircraft is at a present distance D (FIG. 2) from $P_D$, the required aircraft altitude is $H_3$, where $H_3 = DS + H_D$. If however, the actual present aircraft is $H_a$, the altitude error is E, wherein $$E = H_a - H_3 = H_a - (DS + H_D).$$

The altitude error is derived by the computer by first computing $H_3$ and thereafter, computing the difference between $H_3$ and the aircraft's actual present altitude $H_a$. The polarity and magnitude of $E$ are displayed to the pilot, thereby providing him with an indication of the required altitude correction needed to reach the desired vertical profile.

In accordance with the present invention an additional quantity $V_P$, which represents profile vertical speed, is computed by the relationship:

$$V_P = SG.$$

G represents ground speed which is computed in the prior art navigational director system. $V_P$ represents the vertical speed required to keep the aircraft on the profile or on a line parallel to it. In the present invention $V_P$ is displayed. Thus the pilot is provided with all the information needed to reach and maintain the aircraft on the desired vertical profile. This is done by adjusting the vertical speed to reduce the size of E, so that when $E=0$, the actual vertical speed is equal to $V_P$.

It should be appreciated that relatively simple arithmetic processing units, which form part of any conventional computer processor, are capable of computing E and $V_P$. Except for $H_S$ and $H_D$, all the other parameters, needed for these computations, are already available in the prior art navigation director in which only horizontal guidance is provided.

The foregoing teachings may further be explained by referring to FIG. 3 which is a block diagram in which onboard navigation instruments are represented by block 20, a computer memory and a central processor of a computer 21 by blocks 22 and 23 and a vertical guidance display unit by block 24. Briefly, the navigation instruments 20 and the computer 21 are the same as those forming part of the prior art horizontal guidance navigation director, except that in the present invention, the computer memory 22 and the processor 23 are provided with the capability of computing E and $V_P$ for vertical guidance.

Herebefore, the computer 21 is assumed to store in memory 22 the X- and Y-coordinates of the various points, such as the start point $P_S$, the destination point $P_D$, and aircraft present point $Pa$ (FIG. 2) which is continuously updated as the aircraft flies from $P_S$ to $P_D$. The coordinates of $P_S$ and $P_D$ are used to compute $D_0$ and the great circle route which is displayed, relative to present aircraft position.

For explanatory purposes let it be assumed that the X- and Y-coordinates of point $P_S$ are stored in memory locations, represented by registers 31 and 32, those of point $P_D$ in registers 34 and 35, and those of aircraft present position in registers 37 and 38. In accordance with the present invention the memory 22 is assumed to include registers 33 and 36 in which the altitudes $H_S$ and $H_D$ of the start and destination points $P_S$ and $P_D$ are prestored. The memory also includes a register 39 in which is stored aircraft present altitude, such as may be provided from an altimeter, which is part of the onboard instruments 20.

To provide vertical guidance as herebefore explained, when the aircraft is above $P_S$, as the course between $P_S$ and $P_D$ is computed for horizontal guidance, the contents of registers 31, 32, 34 and 35 are supplied to a processor 41 in central processor 23, while the altitudes $H_S$ and $H_D$ in registers 33 and 36 are supplied to a subtracter 42. Processor 41 computed $D_0$, i.e., the distance between $P_S$ and $P_D$, while subtracter 42 provides an output representing $H_S - H_D$ which is divided in divider 44 by $D_0$. Thus, the output of divider 44 is the vertical profile slope S which is stored in a register 45. The profile slope S remains unchanged until a new start point altitude and/or a new destination point altitude are entered, as will be explained hereafter in connection with other features of the present invention.

As the aircraft flies toward $P_D$ the contents of registers 34 and 35 which store the destination point ground coordinates and the contents of registers 37 and 38 which hold the aircraft's present position ground coordinates are supplied to a processor 47. The latter computes D which is the distance on the ground between the aircraft's present position and $P_D$. The outputs of register 45 and processor 47 are multiplied by a multiplier 48 whose output DS is added to $H_A$ in adder 49. Its output $(DS + H_D)$ is subtracted from $H_a$ in subtracter 50 whose output is the altitude error signal E. E is displayed by unit 24. The latter also displays $V_P$ which is represented by the output of a multiplier 51 which multiplies S from register 45 by the ground speed F, which is assumed to be provided by the onboard instruments 20. As previously stressed, E and $V_P$ represent all the information necessary for the pilot to reach the desired vertical profile and maintain the aircraft thereon.

In accordance with the present invention any time during the flight toward $P_D$, the pilot may alter the vertical profile by changing the altitude $H_D$ and/or the altitude of the start point, which if desired may be the altitude of the aircraft's present position. These capabilities may best be explained in conjunction with FIG. 4. Therein, like FIG. 2, $P_S$, $P_D$ and $P_a$ represent the start point, the destination point and aircraft present position, respectively, and $H_S$, $H_D$ and $H_a$ represent start point altitude. The vertical profile is represented by line 10. Let it be assumed that under the diagrammed conditions, the pilot is ordered to modify the vertical profile to one with a destination point altitude $H_{D1}$, with altitude $H_S$ remaining unaltered. The modified profile is designated by numeral 55.

Figure 4:
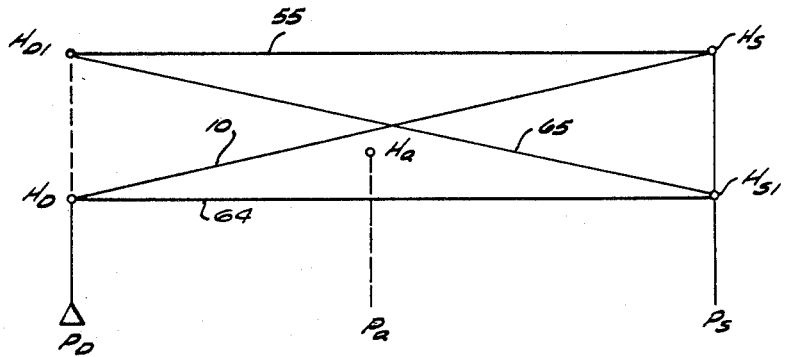
FIG. 4 is another profile diagram.
Figure 5:
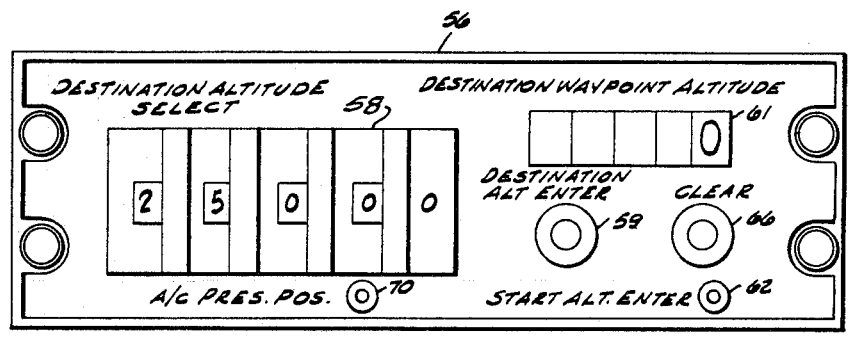
FIG. 5 is a front view of a control panel.

From the foregoing it should be appreciated that the only entry in the memory 22 which need be changed is that in register 36. That is, the new destination altitude $H_{D1}$ has to be stored therein. This may be accomplished by providing the pilot with a control unit whose front panel 56 is shown in FIG. 5. The panel is shown including a plurality of rotary switches 58 which are rotated by the pilot until the desired altitude $H_{D1}$ is displayed. Thereafter, a DESTINATION ALTITUDE ENTER push button or switch 59 is activated. When the latter takes place, the new destination altitude $H_{D1}$ is stored in register 36. The computer may acknowledge receipt of this input by displaying the inserted altitude on a destination altitude readout indicator 61, which in FIG. 5 is assumed to be 25,000 feet. Thereafter, the regular computations for E and $V_P$ are performed as previously described. If desired an additional push button or switch 62, which is also designated by the legend START ALTITUDE ENTER, may be provided. It together with switches 58 may be used to alter the start point altitude, stored in register 33, which is used in the profile slope computations. In FIG. 4, line 64 represents a vertical profile defined by $H_D$ and a new start point altitude $H_{S1}$ which may be entered as the aircraft flies toward $P_D$. Therein line 65 represents a profile, defined by new destination point and start point altitudes $H_{D1}$ and $H_{S1}$, which may be entered sequentially by means of switches 58, 59 and 62 during flight.

As seen from FIG. 5, the control panel 56 further includes a CLEAR button 66. When this button is depressed it is assumed to erase the contents of registers 33 and 36, in which the start and destination altitudes are stored. This terminates the computation and the display of the parameters needed for vertical guidance.

In accordance with the teachings of the present invention at any point during flight, the aircraft's present altitude $H_a$ may be entered and used as a start point altitude to define a profile together with a prestored destination point altitude, such as $H_D$, or with a newly entered destination point altitude, such as $H_{D1}$. This aspect may be highlighted by referring to FIG. 6. Let it be assumed that when the aircraft is at an altitude $H_a$ above point $P_a$, the pilot is ordered to modify the vertical profile and fly from his present altitude $H_a$ directly to $P_D$ along a profile 68. From the foregoing description it should be apparent that to comply with the order all the pilot has to do is replace the ground coordinates and altitude of the start point $P_S$ in registers 31 through 33 with the ground coordinates of his present position $P_a$ which are in registers 37 and 38 and with his present altitude $H_a$ which is in register 39, so that his present position serves as a new start point.

The new entries in registers 31 through 33 are used by processor 41, subtracter 42 and divider 44 to derive a vertical profile slope $S_1$ for the vertical profile 68. Then, as the aircraft proceeds to fly toward $P_D$, $H_a$ and subsequent present altitudes such as $H_{a1}$ are used to derive E to maintain the aircraft altitude on the profile 68.

The transfer of the aircraft's present position ground coordinates and altitude into registers 31 through 33 may be controlled by a control button 70 on the control panel 56 (see FIG. 5). Button 70 is also designated by the legend A/C PRES. POS for aircraft's present position. As is appreciated by those familiar with the art such a button is provided in the prior art navigation director in which only horizontal guidance is provided. Therein, when this button is activated the aircraft's present position is used to define a new start point which is used in computing and displaying a new course for the aircraft to follow in the horizontal plane toward a selected destination point. Thus, in the prior art only the X- and Y-coordinates of the aircraft's present position are transferred to define the new start point. In the present invention however, it is assumed that when button 70 is activated, the aircraft's present altitude 70 $H_a$ in register 39 is also transferred to register 33.

Figure 6:
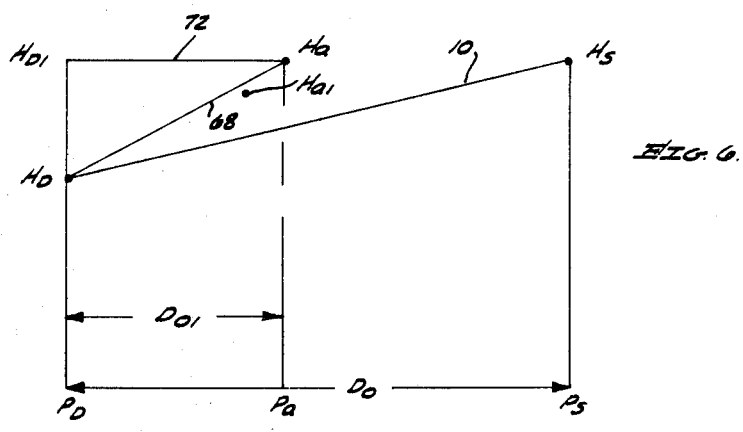
FIG. 6 is yet another profile diagram.

It should be stressed that in addition to entering the aircraft's present position to define a new start point of the profile, a new destination altitude, such as $H_{D1}$, may be entered by means of control panel 56 to define a completely new profile, such as that designated in FIG. 6 by line 72. In practice, the new destination altitude may be entered following the entry of the aircraft's present position, as the new start point.

Figure 7:
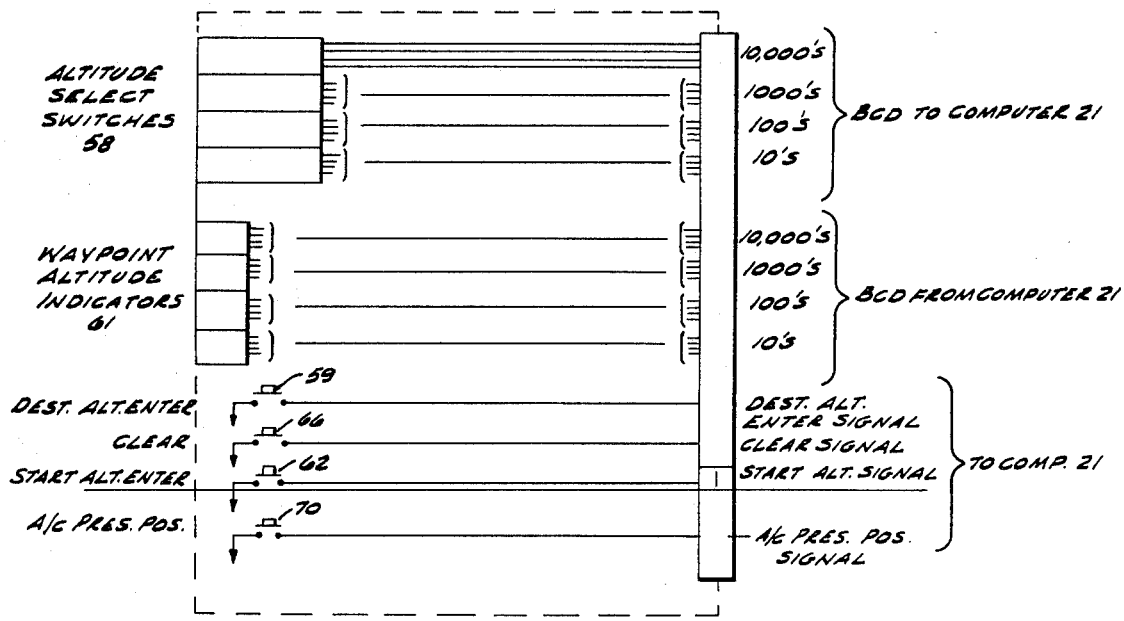
FIG. 7 is a simplified schematic diagram of circuitry incorporated in the control panel shown in FIG. 5.

Attention is now briefly directed to FIG. 7 which is a schematic diagram of the circuitry of the control panel 56, shown in FIG. 5. In FIG. 7, it is assumed that each digit from switches 58 is supplied to the computer 21 in binary coded decimal (BCD) form. Similarly, each confirmed digit from the computer is received by indicators 61 in BCD. Each of the control buttons is supplied a control signal to the computer. The latter may be assumed to include a flip-flop (FF) which is set by the control signal. It remains set until the computer performs the necessary operation after which the FF is reset.

Figure 8:
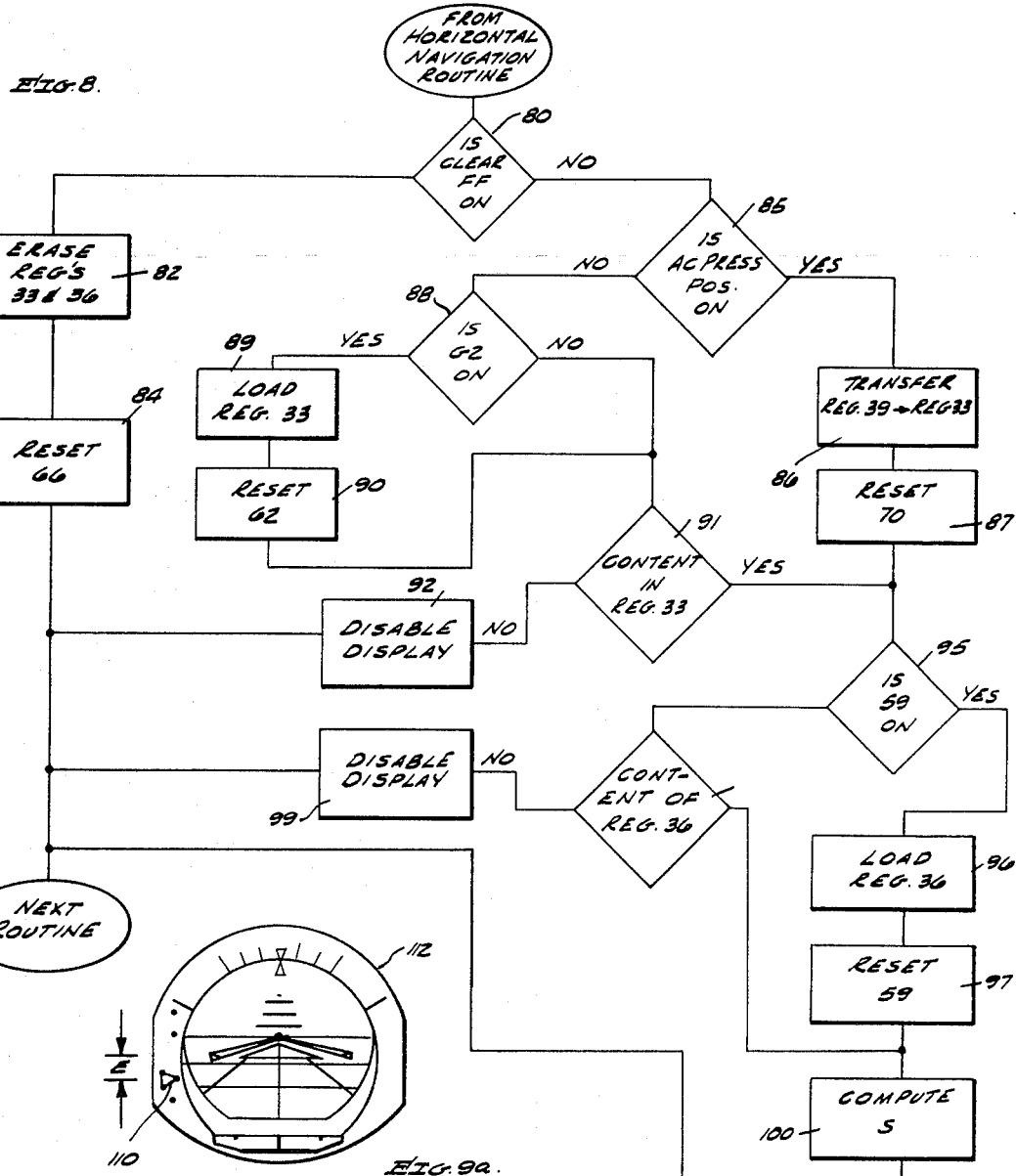
FIG. 8 is a computer flow chart useful in summarizing the teachings of the invention.

It should be apparent to those familiar with the art, particularly those familiar with computers and their programming that computer 21, which performs all the horizontal navigation routines, may be programmed to include a subroutine necessary to provide the vertical guidance as herebefore explained. One example of such a subroutine is shown in FIG. 8 as a flow chart. Therein, it is assumed that when the A/C PRES. POS., button 70 (FIG. 5) is pressed or active, the transfer of the contents of registers 37 and 38 to registers 31 and 32 is performed as part of the horizontal navigation routine.

As shown the clear FF is first interrogated (Block 80). If it is set, i.e., the clear button 66 was depressed the altitudes in registers 33 and 36 are erased (block 82) to terminate the display of the vertical guidance. Then the clear FF is reset (block 82) and the subroutine exits to the next routine.

Figure 9A:
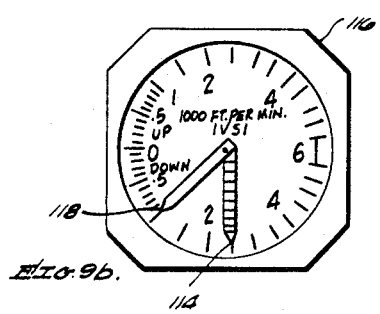
FIGS. 9a and 9b are front views of panels of one embodiment of a display arrangement.

Blocks 85–92 represent the steps necessary to enter a new start altitude and to insure that an entry exists in register 33. If none exists clearly no vertical guidance can be performed. Thus, the display is disabled (block 92) and the next routine is executed. Similarly, blocks 95–99 represent the steps necessary to enter a new destination point altitude or to reserve the presence of such an altitude. If both altitudes for the start and destination points are available in registers 33 and 36 and the clear FF is not set, the S is computed (block 100) followed by computing E (block 101) and $V_P$ (block 102) which are output to display 24. As is appreciated various display techniques may be used to display E and $V_P$. One convenient way is to display E by means of the glide slope pointer 110 (see FIG. 9a) of a conventional FDI glide slope display 112. The required profile vertical speed $V_p$ may be displayed by adding a profile vertical speed pointer 114 to an otherwise conventional IVSI 116 (FIG. 9b), in which aircraft vertical speed is indicated by a pointer 118. It is believed that such a display concept relieves the pilot of the task of "chasing" an instantaneous vertical speed command and leaves to his judgment what flight parameters to vary in order to eliminate the elevation error, E.

The teachings of the present invention may be employed to provide ascent/descent rate control, i.e., achieving a specific altitude at a point via a predetermined vertical speed. This would be an asset in that it is common practice to maintain maximum altitude as long as possible prior to descent for reasons of fuel economy. The mechanization to provide such a capability requires only the presentation of that vertical speed that will cause the aircraft to reach the desired altitude at the specified point. The vertical speed command is found by the equation:

$$V_c = (H_a - H_b)G/D$$

This represents the vertical speed required to reach the waypoint altitude from the present altitude. By observing the command indication the pilot can delay descent until the signal reaches the value at which he wishes to descend.

Figure 9B:
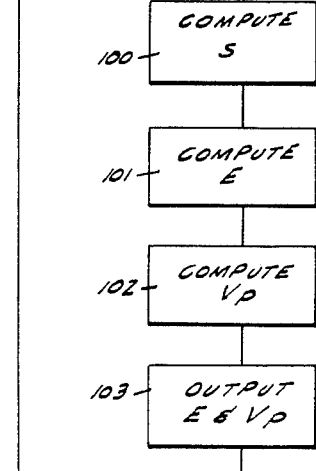

Basically $V_c$ can be derived by subtracting the content of register 36 (FIG. 3) from the content of register 39, multiplying the difference by the ground speed G from the navigation instruments 20 or from the computer, wherein G is computed, and by dividing the product by D from processor 47. $V_c$ can be displayed by pointer 114 (FIG. 9b).

There has accordingly been shown and described herein a novel aircraft vertical guidance system. Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a navigation system the arrangement comprising:

first means for storing, for a destination point and a start point on the ground, a selected destination point altitude and a start point altitude, respectively;

second means for determining aircraft ground speed and aircraft altitude; and third means coupled to said first and second means for deriving a vertical profile as a function of the altitudes stored in said first means and the ground distance between said start and destination points, and for determining the aircraft's elevation error from said profile and a vertical profile speed, needed to maintain said aircraft on said vertical profile.

2. The arrangement as recited in claim 1 further including first display means for displaying the aircraft's elevation error as a function of the difference between the aircraft's altitude and an altitude on said profile which is a function of the ground distance of the aircraft from said destination point, and second display means for displaying the vertical profile speed needed to maintain said aircraft on said vertical profile.

3. The arrangement as recited in claim 1 wherein said system includes means for varying at least one of the altitudes stored in said first means, when said aircraft is in flight toward said destination point.

4. The arrangement as recited in claim 1 wherein said third means include means for deriving a slope of said vertical profile as a function of the difference between the altitudes in said first means and the distance between said start and destination points, and for determining said aircraft elevation error as a function of aircraft actual altitude, said slope, the distance between the aircraft ground position and said destination point and the destination point altitude in said first means.

5. The arrangement as recited in claim 4 wherein said third means include means for deriving said vertical profile speed as a function of said slope and the aircraft ground speed.

6. The arrangement as recited in claim 5 further including first display means for displaying the aircraft's elevation error as a function of the difference between the aircraft's altitude and an altitude on said profile which is a function of the ground distance of the aircraft from said destination point, and second display means for displaying the vertical profile speed needed to maintain said aircraft on said vertical profile.

7. The arrangement as recited in claim 6 wherein said system includes means for varying at least one of the altitudes stored in said first means, when said aircraft is in flight toward said destination point.

8. In a navigation system, the arrangement comprising:
   first means for storing a selected destination point altitude and a start point altitude;
   second means for storing horizontal coordinates of said destination and start points;
   first processing means coupled to said first and second means for deriving a vertical profile slope defining the required altitudes of an aircraft flying from said start point at said start point altitude so that when said aircraft is over said destination altitude it is at said selected destination point altitude;
   second processing means coupled to said first means and to means providing actual aircraft altitude, as said aircraft flies to said destination point, for providing an error signal which is a function of the deviation of said aircraft altitude from said slope; and
   third processing means for deriving aircraft vertical speed required to maintain said aircraft on a vertical profile having a slope equal to said slope derived by said first processing means.

9. The arrangement as recited in claim 8 further including display means coupled to said second and third processing means for displaying said error signal and said vertical speed.

10. The arrangement as recited in claim 8 wherein said arrangement includes means for defining present aircraft position as said start point and means for storing present aircraft altitude as said start point altitude.

11. The arrangement as recited in claim 8 further including means for computing a vertical speed command, which said aircraft is to maintain to reach said destination point at said destination point altitude, as a function of aircraft actual altitude, destination point altitude, aircraft ground speed, and aircraft ground distance from said destination point.

12. In a navigation director for controlling the horizontal navigation of an aircraft, the director being of the type including a computer memory for storing horizontal coordinates of a start point and a destination point, and a computer processor for processing said coordinates to determine the horizontal distance between said points, the improvement comprising:
   storing means in said computer memory for storing a selected altitude for said destination point;
   control means coupled to said computer memory for communicating to said storing means a selected destination point altitude for storage therein;
   first processing means responsive to said destination point altitude and a start point altitude for deriving a vertical profile slope;
   second means for utilizing said slope and the aircraft's actual altitude for displaying a signal whose polarity and magnitude are a function of the direction of and the separation of the actual aircraft altitude from said slope; and
   third means for utilizing said slope and a computed distance between the aircraft ground position and said destination point for deriving a vertical speed for said aircraft, needed to maintain said aircraft on said vertical profile slope.

13. The arrangement as recited in claim 12 further including means for computing a vertical speed command, which said aircraft is to maintain to reach said destination point at said destination point altitude, as a function of aircraft actual altitude, destination point altitude, aircraft ground speed, and aircraft ground distance from said destination point.

14. In an aircraft navigation system of the type including a computer with a memory for storing ground coordinates of a start point and a destination point, and a processor for processing said coordinates to determine the ground distance between said points, an arrangement comprising:
   first means in said memory for storing a destination point altitude;
   second means for determining aircraft actual altitude and aircraft ground speed as said aircraft flies toward said destination point;
   third means for providing the aircraft's ground coordinates as said aircraft flies toward said destination point;
   first means in said processor responsive to the aircraft's ground coordinates and the destination point ground coordinates for computing the aircraft ground distance from said destination point; and
   second means in said processor for computing a vertical speed command as a function of said aircraft ground distance from said destination point, aircraft ground speed, aircraft actual altitude and destination point altitude, said vertical speed command representing required aircraft vertical speed which need be maintained so that when said aircraft arrives at said destination point it is at said destination point altitude.

15. The arrangement as recited in claim 14 wherein the vertical speed command, definable as $V_c$, is equal to $$(H_a - H_D)G/D,$$

wherein $H_a$ is aircraft actual altitude, $H_D$ is destination point altitude, $G$ is aircraft ground speed and $D$ is aircraft ground distance to said destination point.

16. The arrangement as recited in claim 15 further including means for displaying said vertical command speed in conjunction with aircraft actual vertical speed.

17. The arrangement as recited in claim 15 further including means for displaying said vertical command speed.

* * * * *